United States Patent
Hosseinimakarem et al.

(10) Patent No.: US 11,397,526 B2
(45) Date of Patent: Jul. 26, 2022

(54) MEDIA TYPE SELECTION FOR IMAGE DATA

(71) Applicant: Micron Technology, Inc., Boise, ID (US)

(72) Inventors: Zahra Hosseinimakarem, Boise, ID (US); Bhumika Chhabra, Boise, ID (US); Carla L. Christensen, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 16/804,976

(22) Filed: Feb. 28, 2020

(65) Prior Publication Data
US 2021/0271387 A1 Sep. 2, 2021

(51) Int. Cl.
*G06F 3/06* (2006.01)
*G06V 10/56* (2022.01)
*G06V 10/147* (2022.01)

(52) U.S. Cl.
CPC .......... *G06F 3/0604* (2013.01); *G06F 3/0659* (2013.01); *G06F 3/0685* (2013.01); *G06V 10/147* (2022.01); *G06V 10/56* (2022.01)

(58) Field of Classification Search
None
See application file for complete search history.

(56) References Cited

U.S. PATENT DOCUMENTS

| 6,297,988 B1 | 10/2001 | Parker et al. |
| 9,836,484 B1 | 12/2017 | Bialynicka-Birula |
| 2008/0126680 A1 | 5/2008 | Lee et al. |
| 2008/0209114 A1 | 8/2008 | Chow et al. |

(Continued)

FOREIGN PATENT DOCUMENTS

| WO | 2015-155768 A1 | 10/2015 |
| WO | 2010078044 | 7/2019 |

OTHER PUBLICATIONS

Zeman, Jan, Understanding EXIF: What Metadata Is and How to Use It, Learn Photography by Zoner Photo Studio, https://learn.zoner.com/understanding-exif-what-metadata-is-and-how-to-use-it/ (Year: 2018).*
Samsung Community Galaxy S, Shooting RAW photos only saves to Device, https://r1.community.samsung.com/t5/galaxy-s/shooting-raw-photos-only-saves-to-device/td-p/533011, 2018 (Year: 2018).*
EarthBound Light, Photo Tip of the Week, RAW versus JPEG in the Age of Mega Megapixels, http://www.earthboundlight.com/phototips/raw-versus-jpeg-age-of-mega-megapixels.html, Jun. 17, 2018 (Year: 2018).*

(Continued)

*Primary Examiner* — Prasith Thammavong
*Assistant Examiner* — Edmund H Kwong
(74) *Attorney, Agent, or Firm* — Brooks, Cameron & Huebsch, PLLC

(57) ABSTRACT

Systems, apparatuses, and methods related to media type selection for image data are described. Memory systems can include multiple types of memory media (e.g., volatile and/or non-volatile) and can write data to the memory media types. Image data inputs can be written (e.g., stored) in a particular type of memory media characteristics. For instance, selection of memory media can be based on one or more attributes of the image data. In an example, a method can include receiving, by a memory system that comprises a plurality of memory media types, image data from a first image sensor of a plurality of image sensors, identifying one or more attributes of the image data, and writing, based at least in part on the one or more attributes of the image data, the image data to a first memory media type of the plurality of memory media types.

18 Claims, 2 Drawing Sheets

(56) References Cited

U.S. PATENT DOCUMENTS

| | | | |
|---|---|---|---|
| 2012/0117304 A1* | 5/2012 | Worthington | G06F 11/3055 |
| | | | 711/103 |
| 2014/0229656 A1 | 8/2014 | Goss et al. | |
| 2014/0358863 A1* | 12/2014 | Bennett | G06F 16/113 |
| | | | 707/665 |
| 2018/0338108 A1* | 11/2018 | Brady | G06T 3/4038 |
| 2018/0341582 A1 | 11/2018 | Moon | |
| 2019/0068875 A1* | 2/2019 | Wakabayashi | H04N 5/23209 |
| 2019/0303038 A1 | 10/2019 | Hubbard | |
| 2021/0234991 A1* | 7/2021 | Zhang | G06T 7/90 |

OTHER PUBLICATIONS

International Search report and Written Opinion from related international application No. PCT/2021/018514, dated Jun. 10, 2021, 9 pages.

\* cited by examiner

MEDIA TYPE SELECTION FOR IMAGE DATA

TECHNICAL FIELD

The present disclosure relates generally to semiconductor memory and methods, and more particularly, to apparatuses, systems, and methods related to media type selection for image data.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
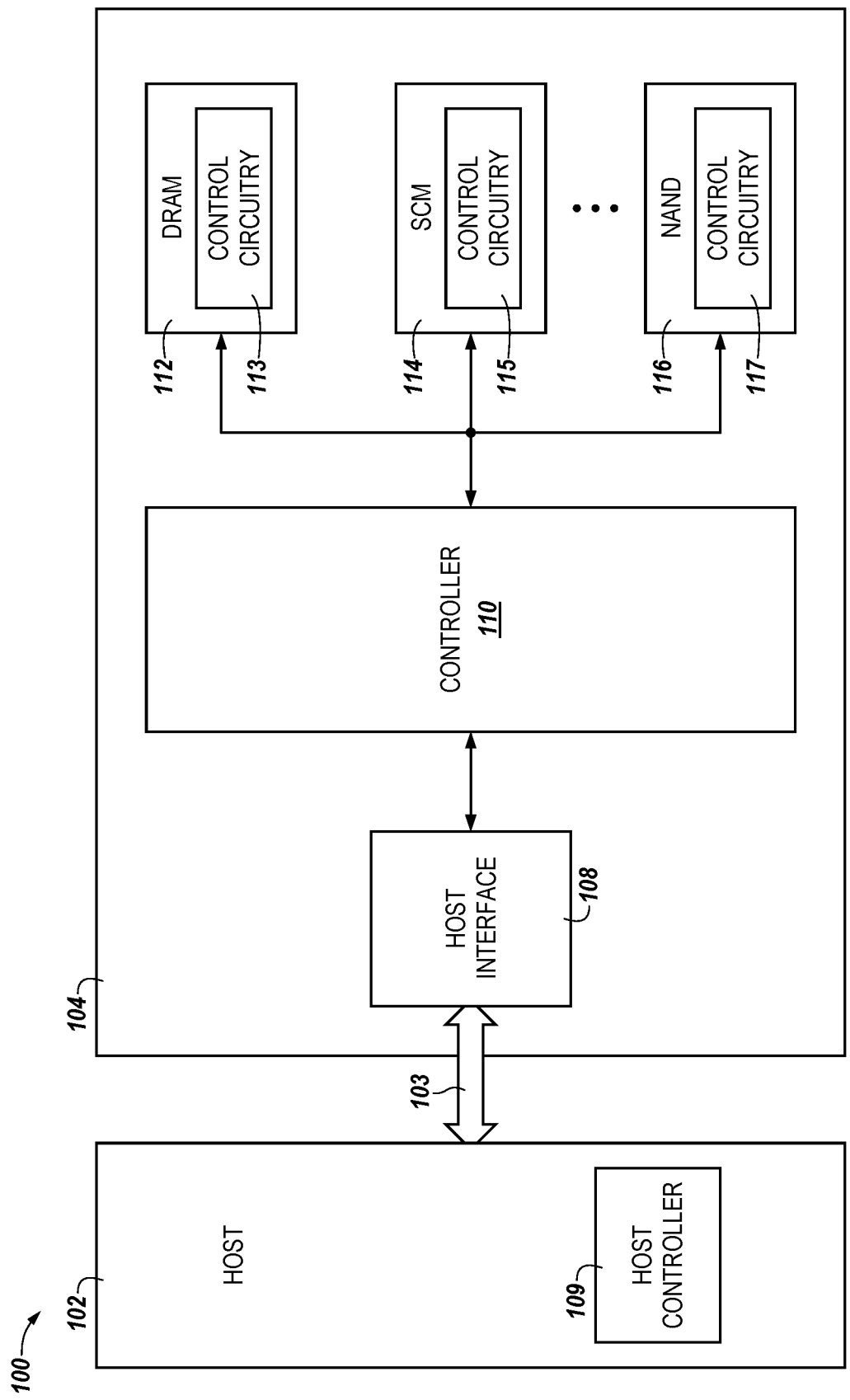
FIG. 1 is a functional block diagram in the form of a computing system including an apparatus including a memory system in accordance with a number of embodiments of the present disclosure.

The present disclosure includes apparatuses, systems, and methods related to memory media type selection for image data. An example method includes receiving, by a memory system that comprises a plurality of memory media types, image data from a first image sensor of a plurality of image sensors (e.g., cameras), identifying one or more attributes of the image data (e.g., a picture), and writing, based at least in part on the one or more attributes of the image data, the image data to a first memory media type of the plurality of memory media types.

In some examples, the one or more attributes of the image data can include pixel quality and/or density of the image data. The pixel quality can be based on lens type of the image sensor and/or image data processing performance. The density of the image data can be based on spot size, pixel size, and/or pixel depth, for example.

In a number of embodiments, the plurality of memory types can include DRAM, storage class memory, and/or NAND. In some examples, the image data can be written to DRAM responsive to image data including a small diameter spot size, a high number of pixels, and/or a high number of bits, while image data with a large diameter spot size, a low number of pixel, and/or a low number of bits can be stored in storage class memory and/or NAND.

Selecting a memory media type for the image data based on one or more attributes of the image data can be a more efficient use of memory. Media types can have different characteristics including volatility, non-volatility, power usage, read/write latency, footprint, resource usage, and/or cost. For example, high density memory like DRAM can be expensive and image data including a large spot size may not require high density memory and can effectively and efficiently be stored in storage class memory, and/or NAND instead.

As used herein, "a number of" something can refer to one or more of such things. For example, a number of memory devices can refer to one or more memory devices. A "plurality" of something intends two or more. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. In some instances, a plurality of similar, but functionally and/or structurally distinguishable, elements or components in the same figure or in different figures may be referenced sequentially with the same element number (e.g., 230-1, 230-2, and 230-N in FIG. 2). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a host interface 108, a controller 110, e.g., a processor, control circuitry, hardware, firmware, and/or software and a number of memory media devices each including control circuitry.

FIG. 1 illustrates a non-limiting example of multiple memory media types in the form of a DRAM 112 including control circuitry 113, SCM 114 including control circuitry 115, and a NAND 116 including control circuitry 117. While three memory media types (e.g., DRAM 112, SCM 114, and NAND 116) are illustrated, embodiments are not so limited, however, and there can be more or less than three memory media types. Further, the types of memory media are not limited to the three specifically illustrated (e.g., DRAM 112, SCM 114, and NAND 116) in FIG. 1, other types of volatile and/or non-volatile memory media types are contemplated. In a number of embodiments, the controller 110, the memory media DRAM 112, SCM, 114, and NAND 116, and/or the host interface 108 can be physically located on a single die or within a single package, e.g., a managed memory application. Also, in a number of embodiments, a memory, e.g., memory media DRAM 112, SCM, 114, and NAND 116, can be included on a single memory system 104.

As illustrated in FIG. 1, the controller 110 can be coupled to the host interface 108 and to the memory media DRAM 112, SCM, 114, and NAND 116 via one or more channels and can be used to transfer data between the memory system 104 and a host 102 having a host controller 109. The host interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The host 102 can be a host system such as a personal laptop computer, a head-mounted display, a vehicle, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be coupled to a host interface 108 of the memory system 104 by a communication channel 103.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, smart home devices, monitoring devices, wearable devices, devices enabling intelligent shopping systems, among other cyber-physical systems.

In some embodiments, the host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing applications, controlling peripherals, etc.

The computing system 100 can include separate integrated circuits or the host 102, the memory system 104, the host interface 108, the controller 110, and/or the memory media DRAM 112, SCM, 114, and/or NAND 116 can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

Although not illustrated in FIG. 1 as to not obscure the examples of the disclosure, the memory system 104 can be communicatively coupled (e.g., connected) to sensors which can be communicatively coupled to the host 102. The term "coupled" means directly or indirectly connected and, unless stated otherwise, can include a wireless connection. As used herein, the term "image sensor" refers to a device that can generate and send image data and/or image receive data. Some examples of image sensors can include camera devices, video devices, among others. The image sensors may transmit data for storage in the memory system 104. For example, the controller 110 can be coupled to a plurality of memory media types (e.g., the memory media DRAM 112, SCM, 114, and NAND 116) to receive data from the plurality of image sensors.

The controller 110 (and/or the host controller 109) can receive image data multiple times from an individual image sensor, or from multiple image sensors. The image sensors may be different types of cameras and/or may be used with different types of lenses. An image sensor can be included in a camera or a detector. For example, an image sensor can be included in a visible light camera, a compact camera, a digital single lens reflex (DSLR), or an infrared detector, among other types of cameras and detectors.

In a number of embodiments, the controller 110 can receive image data from one or more other devices, not illustrated in FIG. 1. The one or more other devices can include a memory device, for example. The memory device can be included in the host 102, the memory system 104, and/or external to the host 102 and the memory system 104.

The controller 110 can identify information about one or more attributes of the image data. For example, the controller 110 can identify the image sensor that transmitted the image data and the pixel quality and/or density of the image data including the type of image sensor and/or the type of lens used with the image sensor. In some examples, the controller 110 can identify a polarization state of the image data and/or wavelength of the image data. The controller 110 can select, based at least in part on the identified information about one or more attributes, a memory media type of the plurality of memory media types (e.g., memory media DRAM 112, SCM, 114, and NAND 116) and write the image data to the selected memory media type. Further, the memory media types (e.g., memory media DRAM 112, SCM, 114, and NAND 116) can be communicatively coupled to each other such that data can be transferred between the memory media.

Figure 2:
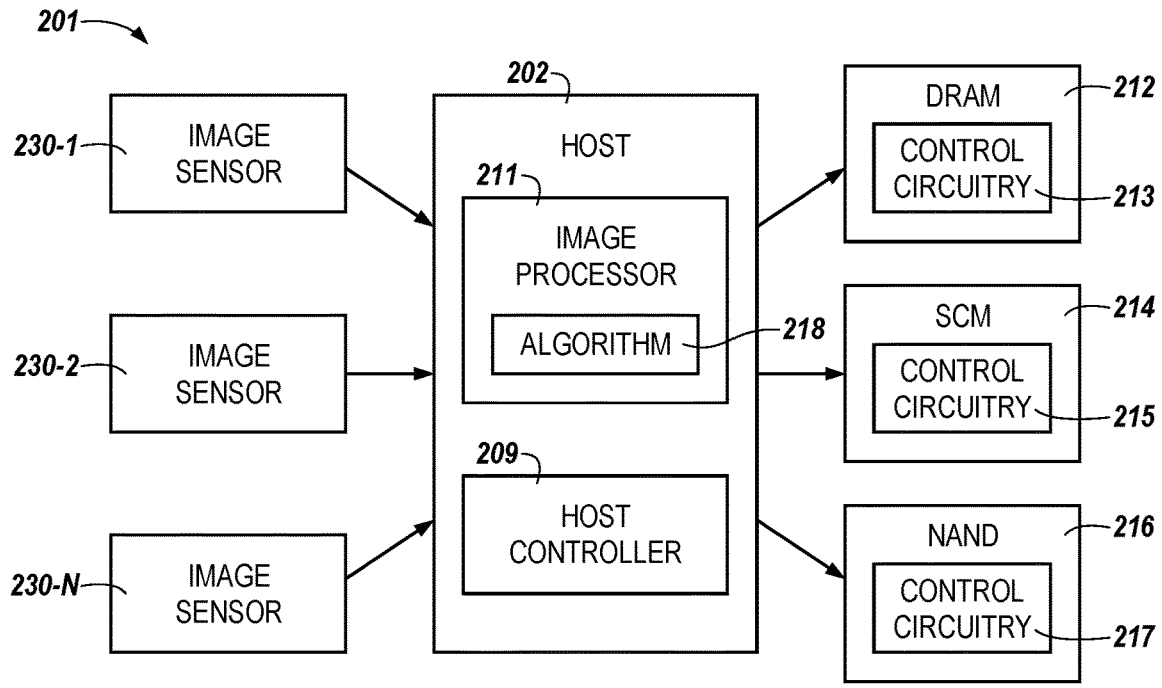
FIG. 2 is a functional block diagram in the form of a computing system including multiple memory media types in accordance with a number of embodiments of the present disclosure.

FIG. 2 is a functional block diagram in the form of a computing system 201 including multiple memory media types 212, 214, and 216 in accordance with a number of embodiments of the present disclosure.

The computing system 201 can include a plurality of image sensors 230-1, 230-2, . . . , 230-N and a host 202, including a host controller 209 which can be analogous to the host 102 and host controller 109 described in connection with FIG. 1. Although not illustrated in FIG. 2 as to not obstruct the examples of the disclosure, computing system 201 can include a controller (e.g., controller 110 described in connection with FIG. 1).

The host 202 can be communicatively coupled to the image sensors 230 via a physical connection (e.g., via wiring, circuitry, etc.) or remotely coupled (e.g., via a wireless signal, near field communication, Bluetooth, Bluetooth Low Energy, RFID, etc.). The host 202 can be communicatively coupled to one or more memory media types 212, 214, and 216. FIG. 2 illustrates a non-limiting example of multiple memory media types in the form of a DRAM 212 including control circuitry 213, SCM 214 including control circuitry 215, and a NAND 216 including control circuitry 217.

The embodiment illustrated in FIG. 2 illustrates an example of the image sensors 230 transmitting data to the host 202 having a host controller 209. The host controller 209 can receive data from at least one image sensor of the image sensors 209, identify one more attributes about the image data, and select one or more of the memory media types (e.g., DRAM 212, SCM 214, and/or NAND 216) to write the image data to, based on the identified attributes. For example, the host controller 209 can receive image data from a first image sensor 230-1 of the plurality of image sensors 230, identify information about one or more attributes of the image data from the first image sensor 230-1, and select one or more of the memory media types (e.g., DRAM 212, SCM 214, and/or NAND 216) to write the image data to.

Attributes of the image data received from an image sensor of the image sensors 230 can include pixel quality and/or density of the image data. The pixel quality can be based on lens type and/or image data processing performance.

Lens types can have different focal lengths. For example, a wide-angle lens can have a focal length of 24 millimeters to 35 millimeters to capture interiors, architecture, and landscapes and a short telephoto lens can have a focal length of 85 millimeters to 135 millimeters to capture portraits. In some examples, image data from a lens with a high focal length may require a higher density memory media type than image data from a lens with a low focal length. For example, image data from a wide-angle lens can be stored in NAND 216 or storage class memory and image data from a short telephoto lens can be stored in DRAM 212.

Image data processing performance can be used to determine pixel quality. Image data processing performance can be based on colors in image data. Image data with a high frequency and variety of colors can require a high density memory and image data with a low frequency and variety of colors can require a low density memory. For example, image data including 1,000 different colors can be written to a high density memory media type (e.g., DRAM 212) and image data including 100 different colors can be written to a low density memory media type (e.g., NAND 216 and/or SCM 214).

A density of image data can be based on spot size, pixel size, and/or pixel depth. Image data with a small diameter spot size, a high number of pixels, and/or a high number of bits may require a high density memory media type, while image data with a large diameter spot size, a low number of pixel, and/or a low number of bits can be stored in a low density memory media type. In some examples, image data with a high density can be written to a first memory media type and image data with a low density can be written to a second memory media type. The first memory media type can be DRAM 212 to store and access the high density image data faster and the second memory media type can be NAND 216 or SCM 214 since low density image data may be stored and accessed at an adequate speed from NAND 216 or SCM 214.

An image processor 211, which can be included in host 202, can determine a density of image data using an algorithm 218. The algorithm 218 can receive image data, calculate the density of the image data using the spot size, pixel size, and/or pixel depth of the image data, and select one or more of the memory media types to write the image data to based on the calculated image density.

The algorithm 218 can determine whether image data is high or low density based on a threshold density. For example, image data can have a high density responsive to being at or above the threshold density and image data can have low density responsive to being below the threshold density. Depending on the available storage in each of the memory media types, the algorithm 218 can move the threshold density higher or lower. For example, the algorithm 218 can increase the threshold density if the DRAM 212 available storage is low and the algorithm 218 can decrease the threshold density if the DRAM 212 available storage is high.

In a number of embodiments, the host controller 209 can store reference information for each of the image sensors 230. The stored reference information can be used to identify information about one or more attributes of image data. The stored reference information can include a lens type used with each of the image sensors 230 and/or image sensor type of each of the image sensors 230. In some examples, a memory media type can be selected responsive to the stored reference information of an image sensor. For example, image data from an image sensor can be stored in volatile or non-volatile memory based on the stored reference information.

Figure 3:
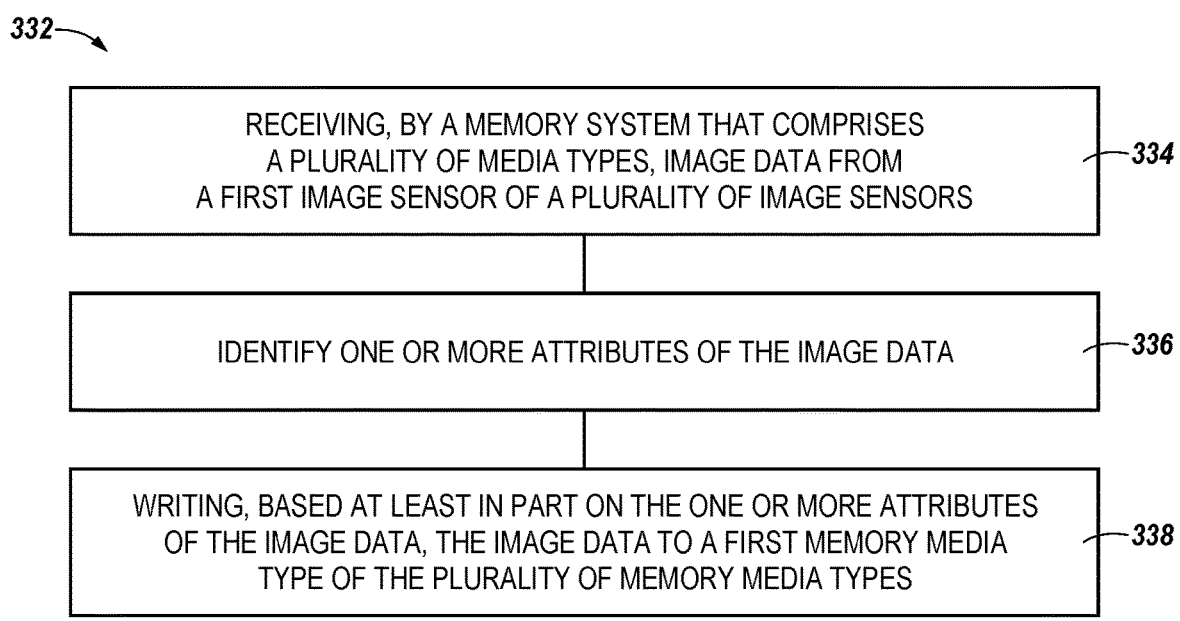
FIG. 3 is a flow diagram representing an example method for media type selection for image data in accordance with a number of embodiments of the present disclosure.

FIG. 3 is a flow diagram 332 representing an example method for media type selection for image data in accordance with a number of embodiments of the present disclosure. At block 334, the method 332 can include receiving, by a memory system that comprises a plurality of media types, image data from a first image sensor of a plurality of image sensors. The memory system can include a host that can receive the image data from the plurality of image sensors. Each of the plurality of image sensors can be used with a lens.

At block 336, the method 332 can include identifying one or more attributes of the image data. The one or more attributes of the image can include pixel quality of the image data and/or density of the image data. The pixel quality of the image data can be based on lens type and/or image data processing performance. The density of the image data can be based on spot size, pixel size, and/or pixel depth.

At block 338, the method 332 can include writing, based at least in part on the one or more attributes of the image data, the image data to a first memory type of the plurality of memory types. The plurality of memory types can include, but are not limited to, DRAM, NAND, and SCM. In some examples, the image data can be written to DRAM responsive to image data with a small diameter spot size, a high number of pixels, and/or a high number of bits, while image data with a large diameter spot size, a low number of pixel, and/or a low number of bits can be written to SCM and/or NAND.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, by a memory system that comprises a plurality of memory media types, image data from a first image sensor of a plurality of image sensors;
   identifying at least one of: lens type, spot size, or pixel depth based at least in part on the image data; and
   writing, based at least in part on at least one of: the lens type, the spot size, or the pixel depth, the image data to a first memory media type of the plurality of memory media types, wherein the first memory media type is dynamic random-access memory (DRAM) responsive to at least one of: the spot size being below a first threshold diameter, the pixel depth being above a first threshold number of bits, or the pixel size being above a first threshold number of pixels, and wherein the first memory media type is NAND responsive to the spot size being above a second threshold diameter, the pixel depth being below a second threshold number of bits, and the pixel size being below a second threshold number of pixels.

2. The method of claim 1, comprising identifying one or more attributes of the image data including at least one of: pixel quality or density of the image data.

3. The method of claim 2, comprising determining the pixel quality of the image data based on at least one of: the lens type or image data processing performance.

4. The method of claim 2, comprising determining the density of the image data based on at least one of: the spot size, pixel size, or the pixel depth.

5. The method of claim 2, comprising writing the image data to the first memory media type responsive to the density of the image data being high density, wherein the first memory media type is the DRAM.

6. The method of claim 2, comprising writing the image data to the first memory media type responsive to the density of the image data being low density, wherein the first memory media type is the NAND.

7. The method of claim 3, comprising determining the pixel quality of the image data based on the image data processing performance includes analyzing colors in the image data.

8. An apparatus, comprising:
   a plurality of memory media types; and
   a controller coupled to the plurality of memory media types, wherein the controller is configured to:
   receive image data from a first image sensor of a plurality of image sensors;
   identify at least one of: lens type, spot size, or pixel depth based at least in part on the image data;
   select, based at least in part on at least one of: the lens type, the spot size, or the pixel depth, a memory media type of the plurality of memory media types; and
   write the image data to the selected memory media type, wherein the selected memory media type is dynamic random-access memory (DRAM) responsive to at least one of: the spot size being below a first threshold diameter, the pixel depth being above a first threshold number of bits, or the pixel size being above a first threshold number of pixels, and wherein the selected memory media type is NAND responsive to the spot size being above a second threshold diameter, the pixel depth being below a second threshold number of bits, and the pixel size being below a second threshold number of pixels.

9. The apparatus of claim 8, wherein the plurality of memory media types include at least one of: the DRAM, storage class memory, or the NAND.

10. The apparatus of claim 8, wherein one or more attributes include at least one of: the spot size, pixel size, or the pixel depth of the image data.

11. The apparatus of claim 8, wherein the controller is configured to select storage class memory and write the image data to the storage class memory responsive to the spot size being above the first threshold diameter, the pixel depth being below the first threshold number of bits, and the pixel size being below the first threshold number of pixels and at least one of: the spot size being below the second threshold diameter, the pixel depth being above the second threshold number of bits, or the pixel size being above the second threshold number of pixels.

12. A system, comprising:
    a plurality of image sensors;
    a plurality of memory media types coupled to the plurality of image sensors; and
    a controller coupled to the plurality of memory media types, wherein the controller is configured to:
    store reference information for each of the plurality of image sensors;
    receive image data from a first image sensor of a plurality of image sensors;
    identify at least one of: lens type, spot size, or pixel depth based at least in part on the image data;
    select, based at least in part on at least one of: the lens type, the spot size, or the pixel depth, a memory media type of the plurality of memory media types; and
    write the image data to the selected memory media type, wherein the selected memory media type is dynamic random-access memory (DRAM) responsive to at least one of: the spot size being below a first threshold diameter, the pixel depth being above a first threshold number of bits, or the pixel size being above a first threshold number of pixels, and wherein the selected memory media type is NAND responsive to the spot size being above a second threshold diameter, the pixel depth being below a second threshold number of bits, and the pixel size being below a second threshold number of pixels.

13. The system of claim 12, wherein the controller is further configured to identify at least one of: the lens type, the spot size, or the pixel depth using the stored reference information.

14. The system of claim 12, wherein the stored reference information includes at least one of the lens type or image sensor type.

15. The system of claim 12, wherein the memory media type selected is volatile memory responsive to the stored reference information of the first image sensor.

16. The system of claim 12, wherein the memory media type selected is non-volatile responsive to the stored reference information of the first image sensor.

17. The system of claim 12, wherein a lens is used with each of the plurality of image sensors.

18. The system of claim 17, wherein the image data includes the lens type of the lens used with the first image sensor.

* * * * *